UNITED STATES PATENT OFFICE.

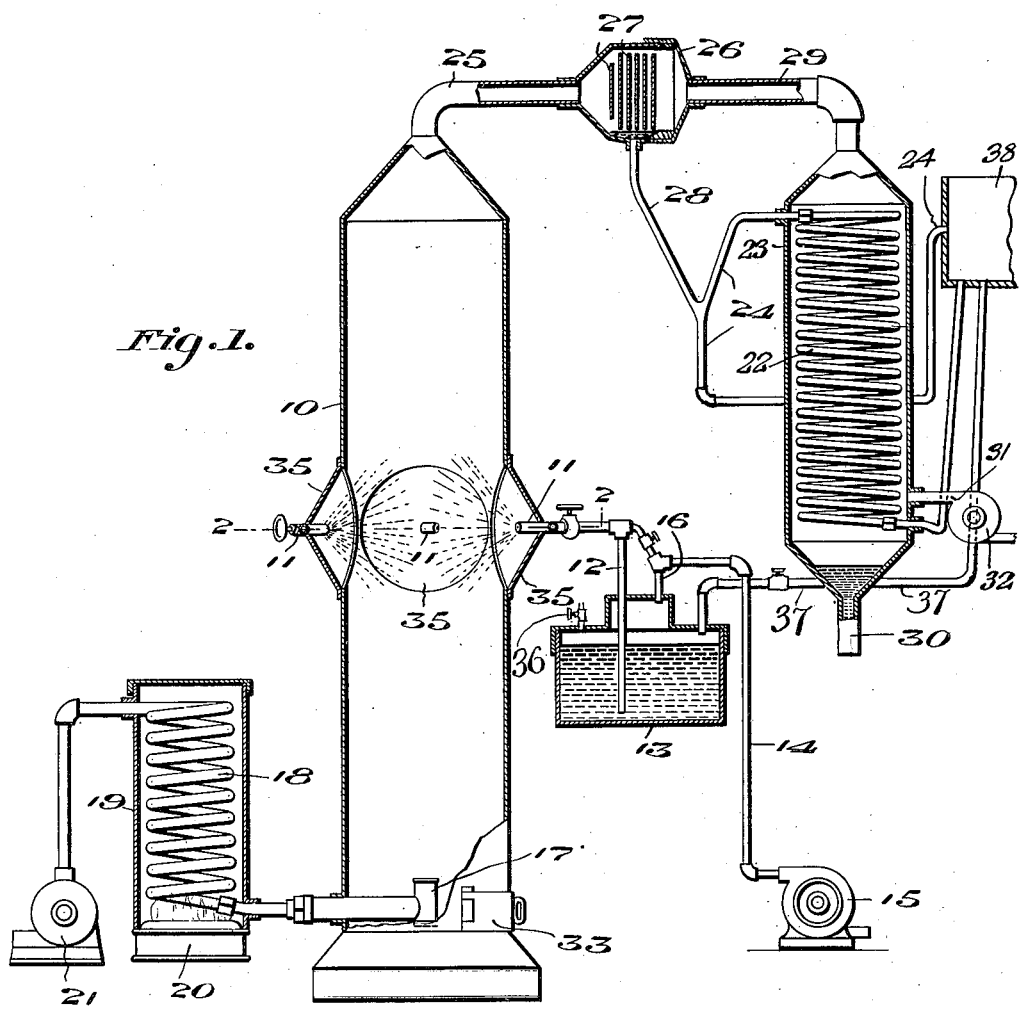

HENRY B. FABER AND WILLIAM H. HARDING, JR., OF NEW YORK, N. Y., ASSIGNORS TO ATOMIZED PRODUCTS CORPORATION, OF NEW YORK, N. Y., A CORPORATION OF NEW YORK.

DESICCATOR.

1,419,664.  Specification of Letters Patent.  Patented June 13, 1922.

Application filed March 26, 1917. Serial No. 157,556.

*To all whom it may concern:*

Be it known that we, HENRY B. FABER and WILLIAM H. HARDING, Jr., citizens of the United States, residing at New York city, in the county of Kings and State of New York, have invented certain new and useful Improvements in Desiccators; and we do hereby declare the following to be a full, clear, and exact description of the invention, such as will enable others skilled in the art to which it appertains to make and use the same.

The present invention relates to the desiccation of the solid constituents of liquids to reduce the same to a dry state, and relates more particularly to an apparatus for effecting this result.

An object in view is the reduction of the area required for efficient treatment of substances without sacrifice of volume treated, or, in other words, the rapid treatment of substances in a relatively reduced area.

Another object is to provide an apparatus of this character having a relatively low container or tower for receiving the liquid in vapor or nebulized form; to pass a current of heated air through the tower, and to conduct the vapor through the current of heated air in a relatively long path of travel in the tower in opposition to the air current for thoroughly saturating the latter and permitting the solid constituents of the vaporized liquid to be deposited in the base of the tower substantially free from moisture.

The invention further aims at the provision of means connected with the tower and with the source of liquid supply to trap and return such solid constituents as may be mechanically carried off from the tower with the air current.

Other objects and advantages of this invention will be brought out, in conjunction with the above, in the following detailed disclosure of the present preferred embodiment of this invention, the same being illustrated in the accompanying drawing, wherein:

Figure 1 is a vertical section taken through a desiccating apparatus constructed according to the present invention, and Figure 2 is a detail, horizontal section taken on the line 2—2 of Figure 1, through the tower, showing the arrangement of the nebulizer nozzles for feeding the liquid into the tower.

Referring to the drawing, 10 designates a container or tower which, in the present instance, is of cylindrical form. One or more sprayer nozzles 11 are arranged substantially peripherally about the tower, and are inclined obliquely in the same direction at an angle approaching a tangent to the circumference of the tower.

A supply pipe 12 is connected to the nozzles 11 and opens into a supply tank 13, adjacent to the bottom thereof. An air supply pipe 14, leading from an air compressor 15, is connected to the supply pipe 12 at a point above the tank 13 for feeding and admixing air with the liquid as it comes from the tank. The tank 13 is closed at its top, as shown, and a branch pipe 16 extends from the air pipe 14 into the upper end of the tank for supplying pressure thereto for the displacement of the liquid. Air pressure in pipe 14 supplies a head for the liquid in tank 13 and also supplies sufficient air and pressure for the spray nozzles 11.

A feeding nozzle 17 projects into the lower end of the tower 10, has a relatively large discharge opening, and opens upwardly and centrally in the tower. The nozzle 17 leads from the lower end of a heating coil 18 enclosed in a casing 19 arranged over a heater 20. A blower 21 is connected to the upper end of the coil 18 and may be open to the atmosphere for drawing in the surrounding air and feeding it under pressure through the heating coil into the tower. Other gas may be employed as the drying agent if desired.

The liquid supply tank 13 is charged from an original source of supply, such as tank 38, which is supplied with heated liquid from a preheating coil 22 which is enclosed in a preferably vertically disposed condenser drum 23. The tank 38 is connected to the upper end of the coil 22 by a pipe 24, and the lower end of said coil leads laterally from the lower end of the drum 23 to receive the liquid to be heated, either from said original source of supply or from any appropriate source not shown. Tank 13 is supplied with liquid through pipe 37 leading from the above-mentioned original source of supply. A vent 36 is adapted to be opened during filling of tank 13.

The tower 10 has a conical top, and a pipe 25 leads from the apex thereof to one side of an intermediate condenser 26, the pipe 25 being of a diameter relative to that of nozzle 17, such as to insure maintenance of the desired pressure in tower 10. Pipe 25 will, therefore, be usually smaller than nozzle 17, but may be of the same size or even larger when conditions and substances being treated so demand; so as to cause uniform upward advance of the air or other gas through the container. The intermediate condenser chamber 26 is of considerably greater cross sectional area than that of the pipe 25 to admit of the expansion of the saturated air which is delivered from the pipe for effecting partial condensation. Baffle plates 27 are arranged in chamber 26 against which the saturated air impinges. The moisture in the saturated air condensing upon the nuclei which are carried from the tower 10 with the air discharging descends by gravity and collects on the bottom of the chamber 26. The capacity of the condenser 26 may be varied, for instance, by the increase or decrease in the containing capacity of chamber 26, as by telescopically moving a section of the chamber relative to a stationary section thereof. This variation will be made according to whether or not all entrained values are being recovered in condenser 26. If an excess of liquid collects in chamber 26, the condensing capacity thereof is decreased, but if tests show that entrained values are being carried beyond chamber 26, then the condensing capacity thereof is increased until, as nearly as may be, all entrained values are recovered in chamber 26 without condensation of any moisture beyond that required to obtain this result. The entrained values thus trapped are returned through a branch pipe 28 to the source of supply from which pipe 37 extends. The discharge end of the condenser 26 is connected by a pipe 29 to the upper end of the drum 23 into which the saturated heated air is delivered.

The condenser drum 23 has a preferably funnel-shaped bottom with a discharge pipe 30 leading to any suitable point for disposal of the residue. The drum 23 also has an air exhaust pipe 31 in one side, preferably near its lower end, for drawing off the gas from the drum, and a blower 32 may be used for this purpose. Blower 32 may have its discharge connected (by piping, not shown) with the intake or blower 21.

The tower 10 is provided near its lower end with a door 33 to facilitate removal of the deposits in the base of the tower. The liquid issuing from nozzles 11 may be charged with electricity from any appropriate source, not shown. The nebulized liquid delivered from nozzles 11 will thus be given a capacity for each particle to repel all others. This will insure effective action of the air on the particles.

The nozzles 11 are mounted in pockets or recesses in the inner wall of the container 10; the pockets being in the form of conical hoods or casings 35 secured at their bases against the outer sides of the container over relatively large openings formed through the latter. The nozzles 11 project through the apexes of the casings 35 and terminate outwardly of the inner circumference of the container to admit of the partial expansion of the nebulized liquid or vapor prior to entering the container proper.

The operation of the above described apparatus is as follows:

In the arrangement shown, the blower 21 feeds atmospheric air under pressure through the heating coil 18 to the nozzle 17. The heater 20 raises the temperature of the air in the coil 18 to the desired degree, and the heated air is forced upwardly through the tower of container 10.

The tower 10 is relatively short, and in order to provide a path of travel of the nebulized liquid through the current of heated air, longer than a direct line would afford, the nozzles 11 are arranged obliquely, as above described, to impart a whirling action to the mixture of nebulized liquid and air, so that as the liquid falls by gravity toward the base of the tower it travels in a substantially spiral path through the upwardly moving body of air. Such path of the nebulized liquid affords prolongation of the action of the air for taking up substantially all of the moisture from the solid constituents of the nebulized liquid notwithstanding the relatively short or low character of the tower.

In order to obtain effective evaporation by atomizing, the particles of liquid constituting the spray must of necessity be small, and the particles of solid held in solution by the liquid particles will naturally be relatively smaller, depending upon the degree of concentration. The apparatus above described operates to effect the required evaporation and atomizing in the following way: The sprays or nozzles 11 are so set that they produce a rotating or gyrating cloud or nebula. The dust particles swing around the orbit of this nebula cloud, attaching themselves to liquid particles, which latter in their turn are evaporated and the solid particles are caused to build up into planetesimals whose size will depend upon the speed of rotation of the cloud, the concentration of the solution evaporated, and the speed of the upward movement of heated air which supports, to a certain extent, the nebula cloud.

The heated air is substantially saturated as it leaves the top of the tower 10 and passes through the pipe 25. As the saturated air enters the condenser 26 it expands and the moisture therein condenses upon entrained solid particles or nuclei, the moisture ladened nuclei falling as liquid to the bottom of the condenser 26 and passing therefrom through the pipe 28 to the original source of supply.

The saturated air, being relieved of the very slight amount of entrained solid constituents, is directed from the intermediate condenser through pipe 29 into the top of the drum 23, and downward in the drum about the coil 22. The moisture-laden air entering drum 23 is hot, and being cooled by contact with the coil 22 gives up its moisture as products of condensation. The liquid conveyed through the coil 22 is thus initially heated and aided in its subsequent vaporization. The products of condensation are collected in the bottom of the drum 23, and lead therefrom through pipe 30 to any suitable point of discharge, while the air in the drum 23 is taken off through pipe 31, as by the suction pipe 32.

It is, of course, understood that the above specifically described apparatus may be changed or modified to meet various mechanical requirements, and to adapt the apparatus for use with fluids and gases of various kinds, without departing from the spirit of this invention.

What we claim is:—

1. In a desiccator, the combination of a tower, means for feeding a draft of heated air through the tower, means for feeding liquid in a nebulized state into the path of the heated air, a condenser connected to the tower for receiving the moisture-laden heated air and condensing the moisture therein upon entrained solid constituents, a liquid supply tank connected to the condenser for receiving the products of condensation from the condenser and returning the same to said liquid feeding means, a second condenser connected to the first condenser to receive the saturated heated air freed from the solid constituents, and a liquid preheating coil in the second condenser connected to said supply tank to heat the liquid therein and adapted to be heated by the air in the second condenser.

2. In a desiccator, the combination of a cylindrical tower having a discharge opening at its upper portion, laterally-disposed pockets spaced uniformly about and opening into the tower, a nozzle for each pocket discharging therethrough tangentially of and within the tower, and means for feeding a draft of air upwardly through the tower from below the discharge of the nozzles.

3. In a desiccator, the combination of a tower, means for heating and delivering a draft of air to the lower end of the tower, means for spraying liquid tangentially into the tower to create a whirling nebulous mass, a condenser connected to the top of the tower adapted to receive and partially condense the moisture from the saturated air from the tower, and a second condenser connected to the first condenser and adapted to receive the air therefrom for condensing the residual moisture from the air.

4. In a desiccator, the combination of a tower, means for feeding a current of heated gas upwardly through the tower, an original source of liquid supply, sprayer nozzles opening into the tower, a tank adapted to receive a liquid from said source to be treated, a supply pipe leading from the tank to the nozzles, means for feeding the liquid from the tank through the nozzles into the tower and into the current of heated gas for driving off the moisture from the liquid, a condenser connected to the tower for receiving the heated moisture ladened gas therefrom, a preheating coil in the condenser communicating with the original source of supply, an intermediate condenser between the tower and said first condenser adapted to partially condense the moisture from the heated gas from the tower, and a pipe leading from the intermediate condenser to the original source of supply to return moisture thereto.

5. In a desiccator, the combination of a tower, means for feeding a current of heated air upwardly through the tower, a plurality of sprayer nozzles opening substantially tangentially into the tower, an original source of liquid supply, a tank adapted to receive liquid from said source, connections between said nozzles and tank, means for atomizing the liquid into the tower through said nozzles, a condenser arranged to receive the heated saturated air from the tower, means in the condenser adapted to receive the liquid to be treated, whereby the liquid is preheated by the heated saturated air, and an intermediate condenser between the tower and the first mentioned condenser adapted to partially condense the moisture from the heated moisture-laden air, and a connection leading from the intermediate condenser for drawing off and returning the condensate to the original source of supply.

6. In a desiccator, the combination of a cylindrical tower having a discharge opening at its upper portion, laterally-disposed pockets opening into the tower and spaced angularly about the tower substantially ninety degrees apart, a nozzle for each pocket discharging therethrough tangentially of and within the tower, and means for feeding a draft of air upwardly through the tower from below the discharge of the nozzles.

In testimony whereof we affix our signatures in presence of two witnesses.

HENRY B. FABER.
WILLIAM H. HARDING, Jr.

Witnesses:
GEO. B. HEATH,
EDGAR M. KITCHIN.